US010565105B2

United States Patent
Zhang (10) Patent No.: US 10,565,105 B2
(45) Date of Patent: Feb. 18, 2020

(54) METHOD AND APPARATUS FOR LOGGING OUT OF APPLICATION

(71) Applicant: WUHAN DOUYU NETWORK TECHNOLOGY CO., LTD., Wuhan (CN)

(72) Inventor: Lei Zhang, Wuhan (CN)

(73) Assignee: WUHAN DOUYU NETWORK TECHNOLOGY CO., LTD., Wuhan (CN)

(*) Notice: Subject to any disclaimer, the term of this patent is extended or adjusted under 35 U.S.C. 154(b) by 219 days.

(21) Appl. No.: 15/750,176

(22) PCT Filed: Mar. 6, 2017

(86) PCT No.: PCT/CN2017/075726
§ 371 (c)(1),
(2) Date: Feb. 2, 2018

(87) PCT Pub. No.: WO2018/090506
PCT Pub. Date: May 24, 2018

(65) Prior Publication Data
US 2019/0004830 A1 Jan. 3, 2019

(30) Foreign Application Priority Data
Nov. 17, 2016 (CN) .......................... 2016 1 1024324

(51) Int. Cl.
*G06F 12/02* (2006.01)
*G06F 9/445* (2018.01)
(Continued)

(52) U.S. Cl.
CPC .......... *G06F 12/0253* (2013.01); *G06F 9/442* (2013.01); *G06F 9/44557* (2013.01); *G06F 9/44594* (2013.01); *G06F 9/5016* (2013.01)

(58) Field of Classification Search
CPC .. G06F 9/45594; G06F 9/442; G06F 9/44557; G06F 9/5016; G06F 12/0253
See application file for complete search history.

(56) References Cited

PUBLICATIONS

AlJarrah, A., Shehab, M.: Maintaining user interface integrity on android. In: 2016 IEEE 40th Annual Computer Software and Applications Conference (COMPSAC), vol. 1, pp. 449-458. IEEE (2016) (Year: 2016).*

(Continued)

*Primary Examiner* — Jacob D Dascomb
(74) *Attorney, Agent, or Firm* — Platinum Intellectual Property LLP (57) ABSTRACT

The present invention discloses a method and apparatus for logging out of an application. The method includes: starting a transparent interface after a starting operation for starting the application is received, wherein the transparent interface is displayed in a transparent state, and the transparent interface is marked as a single task starting mode; starting a main interface of the application to press the transparent interface to the bottom of a system stack memory, wherein interfaces are arranged from the stack bottom to the stack top according to the starting sequence in the system stack memory; starting the transparent interface after a closing operation for closing the application is received to pop up the main interface from the system stack memory; and destroying the transparent interface to close the application. By adopting the method and apparatus provided by the present application, the technical problem that complete logout and memory leak avoidance cannot be achieved at the same time in the method for logging out of an application program in an Android system in the prior art can be solved. The technical effect of both complete logout of the application and memory leak avoidance is achieved.

15 Claims, 4 Drawing Sheets

(51) Int. Cl.
    *G06F 9/50*        (2006.01)
    *G06F 9/4401*      (2018.01)

(56) References Cited

PUBLICATIONS

Chuangang Ren, Yulong Zhang, Hui Xue, Tao Wei, Peng Liu, Towards discovering and understanding task hijacking in android, Proceedings of the 24th USENIX Conference on Security Symposium, p. 945-959, Aug. 12-14, 2015, Washington, D.C. (Year: 2015).*

* cited by examiner

METHOD AND APPARATUS FOR LOGGING OUT OF APPLICATION

RELATED APPLICATIONS

This application is a United States National Stage Application filed under 35 U.S.C 371 of PCT Patent Application Serial No. PCT/CN2017/075726, filed Mar. 6, 2017, which claims Chinese Patent Application Serial No. CN 201611024324.4, filed Nov. 17, 2016, the disclosure of all of which are hereby incorporated by reference in their entirety.

FIELD OF THE INVENTION

The present invention relates to the field of computer technology, and in particular relates to a method and apparatus for logging out of an application.

BACKGROUND OF THE INVENTION

In an Android development process, especially in the case numerous interfaces of an application are opened, common logout manners often cannot achieve complete logout of all interfaces of this application, and if the application cannot be completely logged out and still exists in memory, the memory space is occupied, resulting in waste of system resources.

The method for completely logging out of an application by common means is that a management container of a singleton set List <Activity> is enabled in the application program, and every time when the interface Activity of the application program is opened in the Android system, the current Activity is added to the container, and when complete logout is required, the container is traversed cyclically to close each Activity, thus achieving the function of complete logout of the application.

Although this logout method can achieve the purpose of complete logout, set maintenance is a very complicated process, and because the set has reference to the Activity, a memory leak problem is caused.

Therefore, the method for logging out of an application program in the Android system in the prior art has the technical problem that complete logout and memory leak avoidance cannot be achieved at the same time.

SUMMARY OF THE INVENTION

The present invention provides a method and apparatus for logging out of an application to solve the technical problem that the method for logging out of an application program in an Android system in the prior art cannot achieve complete logout and memory leak avoidance at the same time.

In a first aspect, the embodiment of the present invention provides a method for logging out of application, including:

starting a transparent interface after a starting operation for starting the application is received, wherein the transparent interface is displayed in a transparent state, and the transparent interface is marked as a single task starting mode;

starting a main interface of the application to press the transparent interface to the bottom of a system stack memory, wherein interfaces are arranged from the stack bottom to the stack top according to the starting sequence in the system stack memory;

starting the transparent interface after a closing operation for closing the application is received to pop up the main interface from the system stack memory; and destroying the transparent interface to close the application.

Optionally, the application is an application based on the Android system.

Optionally, before the transparent interface is started, the method further includes: starting a guide interface for transition to the main interface after the starting operation for starting the application is received; and destroying the guide interface to reserve a bottom position of the system stack memory for the transparent interface.

Optionally, after the guide interface is destroyed, the method further includes: obtaining the current amount of free space of the system memory; and recycling system resources consumed by the guide interface when the current amount of free space is smaller than a preset threshold.

Optionally, after the main interface of the application is started, the method further includes: starting a first interface to press the main interface to a position located between the transparent interface and the first interface in the system stack memory; and starting the transparent interface includes: starting the transparent interface to pop up all interfaces located above the transparent interface in the system stack memory.

Optionally, the main interface is marked as a standard starting mode.

Optionally, destroying the transparent interface includes: calling a destroying function finish to destroy the transparent interface.

In a second aspect, an apparatus for logging out of an application is provided, including:

a first starting module for starting a transparent interface after a starting operation for starting the application is received, wherein the transparent interface is displayed in a transparent state, and the transparent interface is marked as a single task starting mode;

a second starting module for starting a main interface of the application to press the transparent interface to the bottom of a system stack memory, wherein interfaces are arranged from the stack bottom to the stack top according to the starting sequence in the system stack memory;

a third starting module for starting the transparent interface after a closing operation for closing the application is received to pop up the main interface from the system stack memory; and a first destroying module for destroying the transparent interface to close the application.

Optionally, the apparatus further includes: a fourth starting module for starting a guide interface for transition to the main interface after the starting operation for starting the application is received; and a second destroying module for destroying the guide interface to reserve a bottom position of the system stack memory for the transparent interface.

Optionally, the second starting module is further used for: starting a first interface to press the main interface to a position located between the transparent interface and the first interface in the system stack memory; and the third starting module is further used for: starting the transparent interface to pop up all interfaces located above the transparent interface in the system stack memory.

One or more technical solutions provided by the embodiment of the present invention at least have the following technical effects or advantages:

According to the method and apparatus provided by the embodiment of the present invention, before the main interface of the application is started, the transparent interface in the single task starting mode is started at first, so that after the main interface is started, the transparent interface can be pressed to the bottom of the system stack memory of the application, and when logout of the application is required, as the transparent interface is in the single task starting mode, all interfaces located above the transparent interface in the system stack memory can be popped up just by starting the transparent interface, and the transparent interface is destroyed to realize complete logout of the application, and as it does not need to enable a separate set to contain reference to each interface Activity, the problem of memory leak is avoided.

The above description is merely an overview of the technical solutions of the present invention. In order to clearly understand the technical means of the present invention so as to implement them according to the contents of the specification, and in order to make the above and other objectives, features and advantages of the present invention more obvious and understandable, the specific embodiments of the present invention are described below.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other accompanying drawings can be obtained by those of ordinary skill in the art without any creative effort.

DETAILED DESCRIPTION OF THE EMBODIMENTS

The embodiments of the present invention provide a method and apparatus for logging out of an application to solve the technical problem that complete logout and memory leak avoidance cannot be achieved at the same time in the method for logging out of an application program in an Android system in the prior art. The technical effect of both complete logout of the application and memory leak avoidance is achieved.

The general idea of the technical solutions in the embodiments of the present application is as follows:

starting a transparent interface after a starting operation for starting the application is received, wherein the transparent interface is displayed in a transparent state, and the transparent interface is marked as a single task starting mode; starting a main interface of the application to press the transparent interface to the bottom of a system stack memory, wherein interfaces are arranged from the stack bottom to the stack top according to the starting sequence in the system stack memory; starting the transparent interface after a closing operation for closing the application is received to pop up the main interface from the system stack memory; and destroying the transparent interface to close the application.

In the method mentioned above, before the main interface of the application is started, the transparent interface in the single task starting mode is started at first, so that after the main interface is started, the transparent interface can be pressed to the bottom of the system stack memory of the application, and when logout of the application is required, as the transparent interface is in the single task starting mode, all interfaces located above the transparent interface in the system stack memory can be popped up just by starting the transparent interface, and the transparent interface is destroyed to realize complete logout of the application, and as it does not need to enable a separate set to contain reference to the interface Activity, the problem of memory leak is avoided.

In order that the objectives, technical solutions and advantages of the embodiments of the present invention are clearer, a clear and complete description of the technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

First Embodiment

Figure 1:
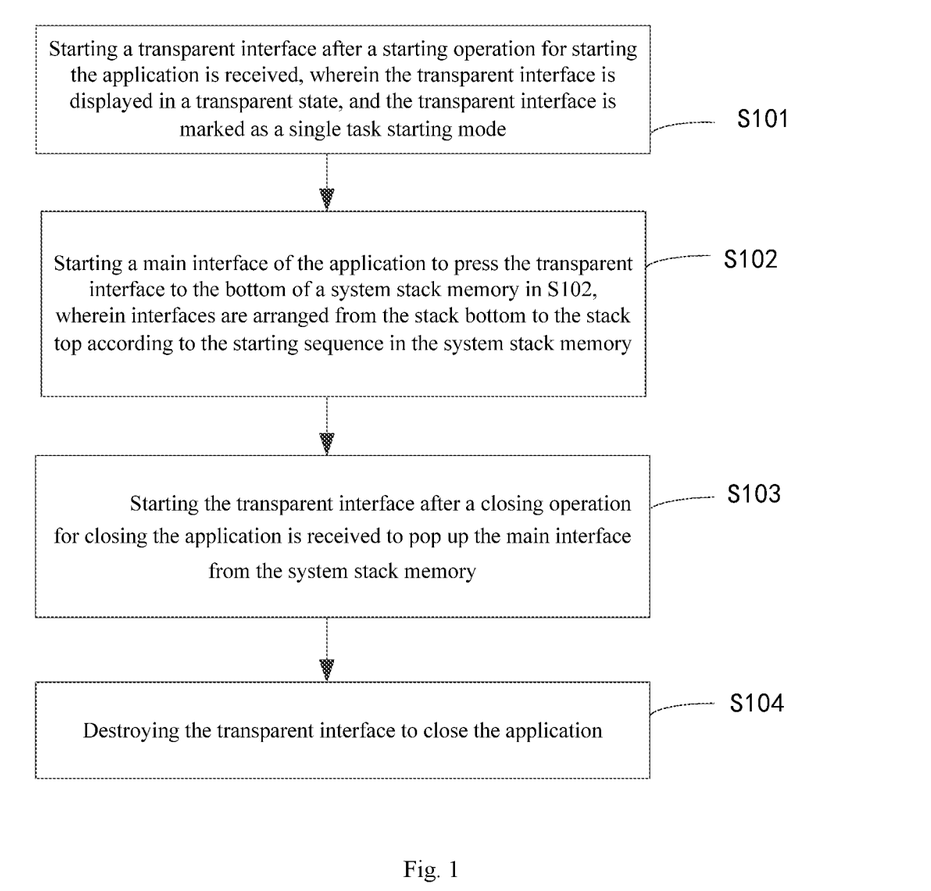
FIG. 1 is a flowchart of a method for logging out of application in an embodiment of the present invention.

The embodiment provides a method for logging out of application, referring to FIG. 1, the method includes:

step S101, starting a transparent interface after a starting operation for starting the application is received, wherein the transparent interface is displayed in a transparent state, and the transparent interface is marked as a single task starting mode;

step S102, starting a main interface of the application to press the transparent interface to the bottom of a system stack memory, wherein interfaces are arranged from the stack bottom to the stack top according to the starting sequence in the system stack memory;

step S103, starting the transparent interface after a closing operation for closing the application is received to pop up the main interface from the system stack memory; and step S104, destroying the transparent interface to close the application.

It should be noted that the method is an application logout method based on the Android system, and when the application is started in the Android system, an un-destroyed interface opened in the application is placed into the system stack memory, wherein the interface that is started earliest is located at the bottom of the system stack memory, and the interfaces are arranged from the stack bottom to the stack top of the system stack memory according to the starting sequence.

It should be further noted that the Android system has four interface starting modes:

The first is a standard starting mode, which is a default starting mode, the starting mode is defaulted when the starting mode attribute of the interface is not configured, and of course, the standard starting mode can also be specified for the interface. In the standard mode, all started interfaces are in the same system stack memory. The interface Activity instances pressed into the stack earlier are located at the stack bottom in sequence, and the interface Activity instance pressed into the stack later is at the stack top, the Activity instance at the stack top is in an activity state, and the others are in a non-activity state.

The second is a single top (singleTop) starting mode, when the starting mark is the instance Activity of the mode, if an activated Activity instance has been located at the stack top of the system stack memory, the Activity instance on the stack top at present is reused, and otherwise, a new target Activity instance is created in the singleTop starting mode.

The third is a single task (singleTask) starting mode, when the starting mark is target Activity instance of the mode, regardless of the position of the target instance in the stack, whether at stack top, stack bottom or at the middle of the stack, as long as the target Activity instance is in the system stack memory, the Activity instance object can be reused, and then all Activity instances above the Activity instance object are popped up and cleared.

The fourth is a single instance (singleInstance) starting mode, and a certain Activity can be shared in the mode. For example, a MainActivity instance is created in the system stack memory of the application 1, the application 2 also needs to activate the MainActivity, then it and does not need to create the MainActivity instance, but can directly share the MainActivity instance.

In the embodiment of the present application, a transparent interface marked as the singleTask starting mode is creatively set, and the transparent interface is started before starting of the main interface, so that the transparent interface is located at the bottom of the system stack memory of the application, and by smartly using the property that the interface in the singleTask starting mode, when being started, can automatically pop up the Activity above the interface, the transparent interface is started to clear all interface located above the transparent interface, and thus the logout and release of all interface resources of the application can be realized just by starting and destroying the transparent interface.

Figure 2:
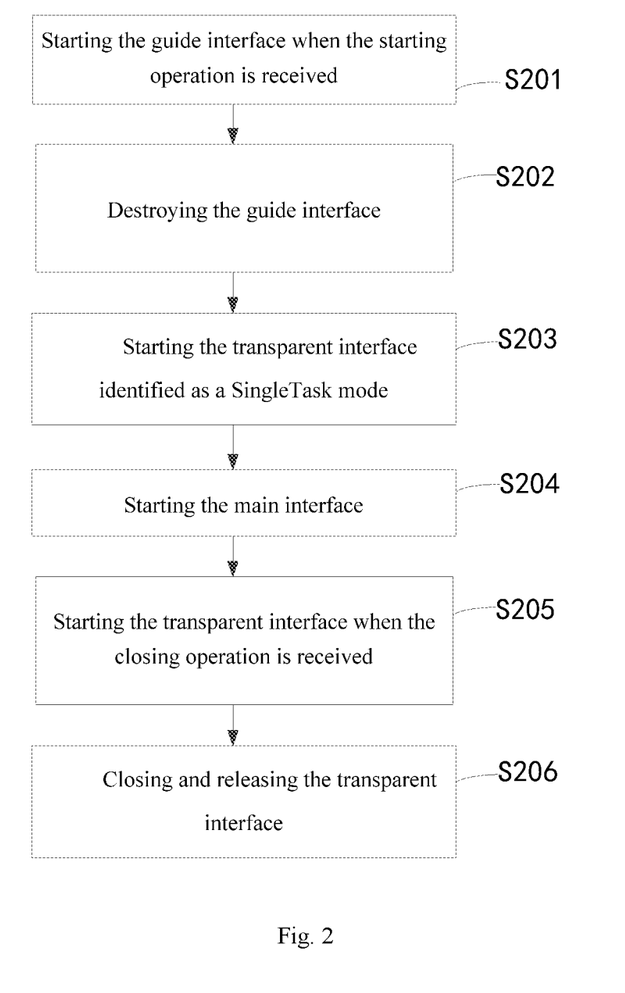
FIG. 2 is a flowchart of an application logout instance in an embodiment of the present invention.

The method for logging out of an application provided by the present application will be introduced below in detail in combination with FIGS. 1 and 2:

Firstly, step S101 is executed, starting the transparent interface after the starting operation for starting the application is received, wherein the transparent interface is displayed as the transparent state, and the transparent interface is marked as the single task starting mode.

In view of the fact that during specific implementation, the majority of applications have a guide interface during startup, the main function of the guide interface is to process an initialization operation during the startup or reserve a position for later-operation advertisement. In generally, the guide interface of the application program just appears during the first time startup. As the guide interface only needs to appear once, in the embodiment of the present application, it may be set as follows:

after the starting operation for starting the application is received, starting the guide interface for transition to the main interface; destroying the guide interface to reserve a bottom position of the system stack memory for the transparent interface; and then starting the transparent interface. The specific method for destroying the guide interface may be a method of calling a finish function in the activity, and the main function of this method is to destroy the current activity.

During specific implementation, after the guide interface is destroyed, the system will not immediately recycle destroyed resources, in order to improve the speed of starting the transparent interface subsequently, after the guide interface is destroyed, the method may further include: obtaining the current amount of free space of the system memory; and recycling system resources consumed by the guide interface when the current amount of free space is smaller than a preset threshold.

Specifically, the method for obtaining the current amount of free space of the system memory may be as follows: an ActivityManager management class of the system is obtained at first through the mContext.getSystemService (Context.ACTIVITY_SERVICE) function, and the main function of the function is to obtain a management instance of the ActivityManager from the Android system. Then, related information of the memory is obtained through the ActivityManager, the specific obtaining method is to return a MemoryInfo (description of related information of the memory) instance through the ActivityManager.MemoryInfo ( )function. The getTotalMem is called by the MemoryInfo to obtain a memory mark totalMem. Then, the current available memory space is obtained by calling getAvailMem and is marked as availMem. Finally, totalMem is divided by availMem to calculate the remaining memory percentage, i.e., the current amount of free space.

When it is determined that the system resources are strained by comparing the current amount of free space with the preset threshold, the GC function of the system may be called to notify the system to perform emergency recovery, so that the system will immediately release and recycle the memory resources of the system, and thus the subsequent appearance speed of the transparent interface can be accelerated.

Therefore, as the transparent interface is started at first after the guide interface is started, and the guide interface is destroyed before the transparent interface is started, the transparent interface will exist at the lowest bottom of the system stack memory, and this also paves the way for the subsequent destroying operation.

Certainly, during specific implementation, the transparent interface may also be set to be started before the guide interface is started, so that it can ensure that the transparent interface is located at the bottom of the system stack memory without destroying the guide interface.

In addition, during specific implementation, there is also the situation that no guide interface exists when the application is started, in this case, the transparent interface only needs to be started before the guide interface is started so as to ensure that the transparent interface is located at the bottom of the system stack memory.

In the embodiment of the present application, the transparent interface is preset as an interface in a fully transparent display state. On the one hand, as the transparent interface is completely transparent, its startup does not affect the display of other interfaces; and on the other hand, there is no control resource on the transparent interface, so the memory occupation may be omitted, and the additional overhead of the system is very small.

During specific implementation, marking the transparent interface as the single task (singleTask) starting mode may be declared in an AndroidManifest.xml file, the specific marking manner is to set android:launchMode="SingleTask", so that when the system starts the transparent interface, the system starts the transparent interface in the SingleTask manner.

Then, the step S102 is executed: starting the main interface of the application to press the transparent interface to the bottom of a system stack memory, wherein interfaces are arranged from the stack bottom to the stack top according to the starting sequence in the system stack memory.

Specifically, after an Oncreate function is executed on the transparent interface, that is, after the startup is completed, the main interface is started immediately. Since the transparent interface is started earliest, it is pressed to the bottom of the system stack memory. The Oncreate function is a life cycle function of the interface in the Android system, this function is called when the system starts an interface. Since the transparent interface has no interface resource, its starting speed is very high, and the main interface is started immediately after the startup, so the user can not perceive the existence of the transparent interface, the user feels that the system directly enters the main interface and cannot feel the process of entering the transparent interface at all, and thus the user experience is guaranteed.

When the user uses the application program, the user also opens other interfaces beside opening the main interface, that is, after the main interface of the application is started, the method further includes: starting a first interface, a second interface, and/or a third interface, but since the starting time of the transparent interface is prior to that of the main interface and the subsequently started first interface, the second interface and/or the third interface, the transparent interface is always at the bottom in the system stack memory so as to prepare for popping up all interfaces of the application to eliminate the same.

In the embodiment of the present application, the main interface and/or subsequently started other interfaces may be defaulted or marked as the standard starting mode, or may be marked as other starting modes, which is not limited herein.

Then, the step S103 is executed: starting the transparent interface after the closing operation for closing the application is received to pop up the main interface from the system stack memory.

During specific implementation, the closing operation may be an operation of clicking a preset logout mark on the application program interface, and may also be an operation of triggering a back key of an electronic device, which is not limited herein.

Specifically, after the closing operation for closing the application is received, the transparent interface is started based on associated trigger preset by a developer, and as the transparent interface is stored at the most bottom of the system stack memory, and the starting mode of the transparent interface is marked as the SingleTask mode in advance, therefore when the transparent interface is started, the system actively and automatically pops up all interface located above the transparent interface in the system stack memory and displays the transparent interface in the current interface. As the transparent interface is transparent, the user will directly observe the main interface of an operating system of the electronic device.

In order to distinguish the difference between starting the transparent interface when the application is started and starting the transparent interface when the application is logged out, a closing command can be transmitted to the transparent interface through an Intent object in the Android after the closing operation for closing the application is received. A closeFlag flag is packaged in the Intent in advance, that is, the flag is stored as true and is packaged in the Intent. The specific package mode is realized by calling a putExtra ("closeFlag", true) function of the Intent, and the main function of the function is to store the value true of the closeFlag in the Intent object.

Then, the step S104 is executed: destroying the transparent interface to close the application.

Specifically, during the process of logging out of the application, when the transparent interface is started, the Intent object transmitted through the startup is parsed, and the specific parsing is to obtain the value in the Intent through the getExtra function and to obtain the value in the started Intent object by calling the getExtra ("closeFlag") in the Intent. If the obtained value is true, it is determined that the application program needs to be logged out, and the destroying function finish is called directly to destroy the transparent interface. Since the transparent interface is the last interface of the application at this time, the application is completely logged out after the transparent interface is destroyed.

Specifically, in the present application, before the main interface is started, the transparent interface identified as the single task starting mode is started, so that the transparent interface is always located at the bottom of the system stack memory of the application, and by smarty using the property that all interfaces located above can be popped up in the single task starting mode, the application can be completely logged out without using a preset set to contain the reference to the Activity, therefore the objective of complete logout is achieved, and the problem of memory leak is avoided effectively.

After the specific implementation steps of the method for logging out of an application provided by the present application are introduced, in order to facilitate a more vivid understanding of the method provided by the present application, the method provided by the present application will be illustrated below by a specific example in combination with FIGS. 2 and 3.

Figure 3:
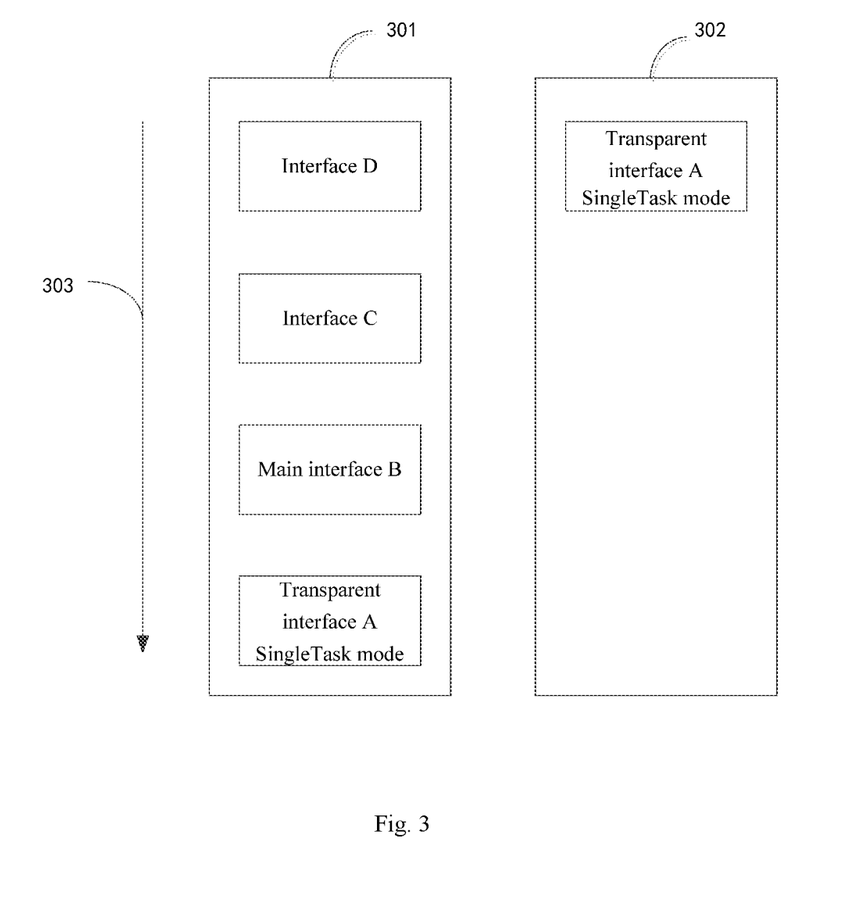
FIG. 3 is a schematic diagram of an application logout instance in an embodiment of the present invention.

As shown in the flow in FIG. 2, when the starting operation of starting the first application is received, firstly, step S201 is executed to start the guide interface, and then step S202 is executed to destroy the guide interface; subsequently step S203 is executed to start a transparent interface A identified as a SingleTask mode; and then step S204 is executed to start a main interface B and press the transparent interface A to the stack bottom;

then, during the process of using the first application by the user, an interface C and an interface D are started one after another, so that the interfaces are arranged in the system stack memory of the first application according to the sequence shown by a column 301 in FIG. 3, and an arrow 303 in FIG. 3 represents a direction from the stack top to the stack bottom; and after the closing operation of closing the application is received, step S205 is executed to start the transparent interface A so as to pop up the main interface B, the interface C and the interface D from the system stack memory, so that the interfaces are arranged in the system stack memory of the first application according to the sequence shown by a column 302 in FIG. 3; and step S206 is executed to close and release the transparent interface A so as to completely log out of the first application.

Based on the same inventive concept, the embodiment of the present invention further provides an apparatus corresponding to the method in the first embodiment. See the second embodiment.

Second Embodiment

Figure 4:
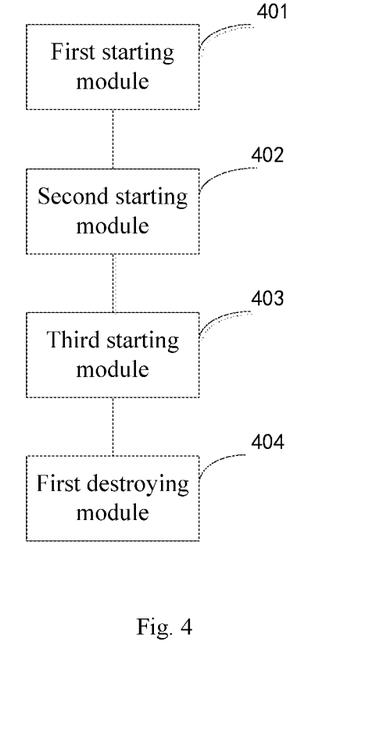
FIG. 4 is a structural schematic diagram of an apparatus for logging out of an application in an embodiment of the present invention.

The embodiment provides an apparatus for logging out of an application, referring to FIG. 4, the apparatus includes:

a first starting module 401 for starting a transparent interface after a starting operation for starting the application is received, wherein the transparent interface is displayed in a transparent state, and the transparent interface is marked as a single task starting mode;

a second starting module 402 for starting a main interface of the application to press the transparent interface to the bottom of a system stack memory, wherein interfaces are arranged from the stack bottom to the stack top according to the starting sequence in the system stack memory;

a third starting module 403 for starting the transparent interface after a closing operation for closing the application is received to pop up the main interface from the system stack memory; and a first destroying module 404 for destroying the transparent interface to close the application.

During specific implementation, the apparatus may be a smart phone, a tablet computer or the like, which is not limited herein.

In the embodiment of the present application, the electronic device further includes:

a fourth starting module for starting a guide interface for transition to the main interface after the starting operation for starting the application is received; and a second destroying module for destroying the guide interface to reserve a bottom position of the system stack memory for the transparent interface.

In the embodiment of the present application, the second starting module 402 is further used for: starting a first interface to press the main interface to a position located between the transparent interface and the first interface in the system stack memory; and the third starting module 403 is further used for: starting the transparent interface to pop up all interfaces located above the transparent interface in the system stack memory.

As the apparatus described in the second embodiment of the present invention is the apparatus used for implementing the method for logging out of an application in the first embodiment of the present invention, based on the method described in the first embodiment of the present invention, those skilled in the art can understand the specific structures and modifications of the apparatus, and thus it will not be repeated herein. Any apparatuses adopted by the method in the first embodiment of the present invention belong to the protection scope of the present invention.

The technical solutions provided by the embodiment of the present invention at least have the following technical effects or advantages:

According to the method and apparatus provided by the embodiment of the present invention, before the main interface of the application is started, the transparent interface in the single task starting mode is started at first, so that after the main interface is started, the transparent interface can be pressed to the bottom of the system stack memory of the application, and when logout of the application is required, as the transparent interface is in the single task starting mode, all interfaces located above the transparent interface in the system stack memory can be popped up just by starting the transparent interface, and the transparent interface is destroyed to realize complete logout of the application, and as it does not need to enable a separate set to contain reference to each interface Activity, the problem of memory leak is avoided.

Those skilled in the art should understand that the embodiments of the present invention may be provided as a method, a system or a computer program product. Accordingly, the present invention may be in the form of a complete hardware embodiment, a complete software embodiment, or an embodiment combining software with hardware. Moreover, the present invention may be in the form of a computer program product which is implemented on one or more computer usable storage media (including, but not limited to, a magnetic disk memory, CD-ROM and an optical memory and the like) containing computer usable program codes.

The present invention is described with reference to the method, the device (system) in the embodiments of the present invention and a flowchart and/or a block diagram of the computer program product. It should be understood that computer program instructions may achieve each flow and/or block in the flowchart and/or the block diagram and the combination of the flows and/or blocks in the flowchart and/or the block diagram. These computer program instructions may be provided to a general-purpose computer, a special-purpose computer, an embedded processor or a processor of other programmable data processing device to generate a machine, such that the instructions executed by the computers or the processor of the other programmable data processing device generate an apparatus for achieving the functions specified in one or more flows of the flowchart and/or one or more blocks of the block diagram.

These computer program instructions may also be stored in a computer readable memory capable of guiding the computer or other programmable data processing device to work in a particular manner, such that the instructions stored in the computer readable memory generate a manufactured product including an instruction apparatus, and the instruction apparatus achieves the specified functions in one or more flows of the flowchart and/or one or more blocks of the block diagram.

These computer program instructions may also be loaded on the computer or other programmable data processing device, to execute a series of operation steps on the computer or other programmable data processing device to produce processing achieved by the computer, such that the instructions executed on the computer or other programmable data processing device provide steps for achieving the functions specified in one or more flows of the flowchart and/or one or more blocks of the block diagram.

Although the preferred embodiments of the present invention have been described, those skilled in the art may make other changes and modifications to these embodiments once they have acquired the basic inventive concept. Therefore, the appended claims are intended to be interpreted as including the preferred embodiments and all the changes and modifications that fall within the scope of the present invention.

Obviously, those skilled in the art may make various modifications and variations to the embodiments of the present invention without departing from the spirit and scope of the embodiments of the present invention. As such, if these modifications and variations of the embodiments of the present invention fall within the scope of the claims of the present invention and the equivalent technologies, the present invention is also intended to include these changes and modifications.

The invention claimed is:

1. A method for logging out of an application, comprising:
   starting a transparent interface after a starting operation for starting the application is received, wherein the transparent interface is displayed in a transparent state, and the transparent interface is marked as a single task starting mode;

starting a main interface of the application to press the transparent interface to the bottom of a system stack memory, wherein interfaces are arranged from the stack bottom to the stack top according to the starting sequence in the system stack memory;

starting the transparent interface after a closing operation for closing the application is received to pop up the main interface from the system stack memory; and destroying the transparent interface to close the application.

2. The method of claim 1, wherein the application is an application based on the Android system.

3. The method of claim 2, wherein destroying the transparent interface comprises:

calling a destroying function to finish destroying the transparent interface.

4. The method of claim 1, wherein before the transparent interface is started, the method further comprises:

starting a guide interface for transitioning to the main interface after the starting operation for starting the application is received; and destroying the guide interface to reserve a bottom position of the system stack memory for the transparent interface.

5. The method of claim 4, wherein after the guide interface is destroyed, the method further comprises:

obtaining the current amount of free space of the system memory; and recycling system resources consumed by the guide interface when the current amount of free space is smaller than a preset threshold.

6. The method of claim 5, wherein destroying the transparent interface comprises:

calling a destroying function to finish destroying the transparent interface.

7. The method of claim 4, wherein destroying the transparent interface comprises:

calling a destroying function to finish destroying the transparent interface.

8. The method of claim 1, wherein:

after the main interface of the application is started, the method further comprises: starting a first interface to press the main interface to a position located between the transparent interface and the first interface in the system stack memory; and starting the transparent interface comprises: starting the transparent interface to pop up all interfaces located above the transparent interface in the system stack memory.

9. The method of claim 8, wherein destroying the transparent interface comprises:

calling a destroying function to finish destroying the transparent interface.

10. The method of claim 1, wherein the main interface is marked as a standard starting mode.

11. The method of claim 10, wherein destroying the transparent interface comprises:

calling a destroying function to finish destroying the transparent interface.

12. The method of claim 1, wherein destroying the transparent interface comprises:

calling a destroying function to finish destroying the transparent interface.

13. An apparatus for logging out of an application, comprising a memory stored with computer program instructions and a processor, and wherein the computer program instructions, when executed by the processor, cause the processor to implement the following steps:

starting a transparent interface after a starting operation for starting the application is received, wherein the transparent interface is displayed in a transparent state, and the transparent interface is marked as a single task starting mode;

starting a main interface of the application to press the transparent interface to the bottom of a system stack memory, wherein interfaces are arranged from the stack bottom to the stack top according to the starting sequence in the system stack memory;

starting the transparent interface after a closing operation for closing the application is received to pop up the main interface from the system stack memory; and destroying the transparent interface to close the application.

14. The apparatus of claim 13, wherein the computer program instructions, when executed by the processor, cause the processor to implement the following steps:

starting a guide interface for transitioning to the main interface after the starting operation for starting the application is received; and destroying the guide interface to reserve a bottom position of the system stack memory for the transparent interface.

15. The apparatus of claim 13, wherein the computer program instructions, when executed by the processor, cause the processor to implement the following steps:

starting a first interface to press the main interface to a position located between the transparent interface and the first interface in the system stack memory; and starting the transparent interface to pop up all interfaces located above the transparent interface in the system stack memory.

* * * * *